May 2, 1944. A. D. EPLETT 2,347,676
SAFETY VALVE
Filed March 10, 1943 2 Sheets-Sheet 1
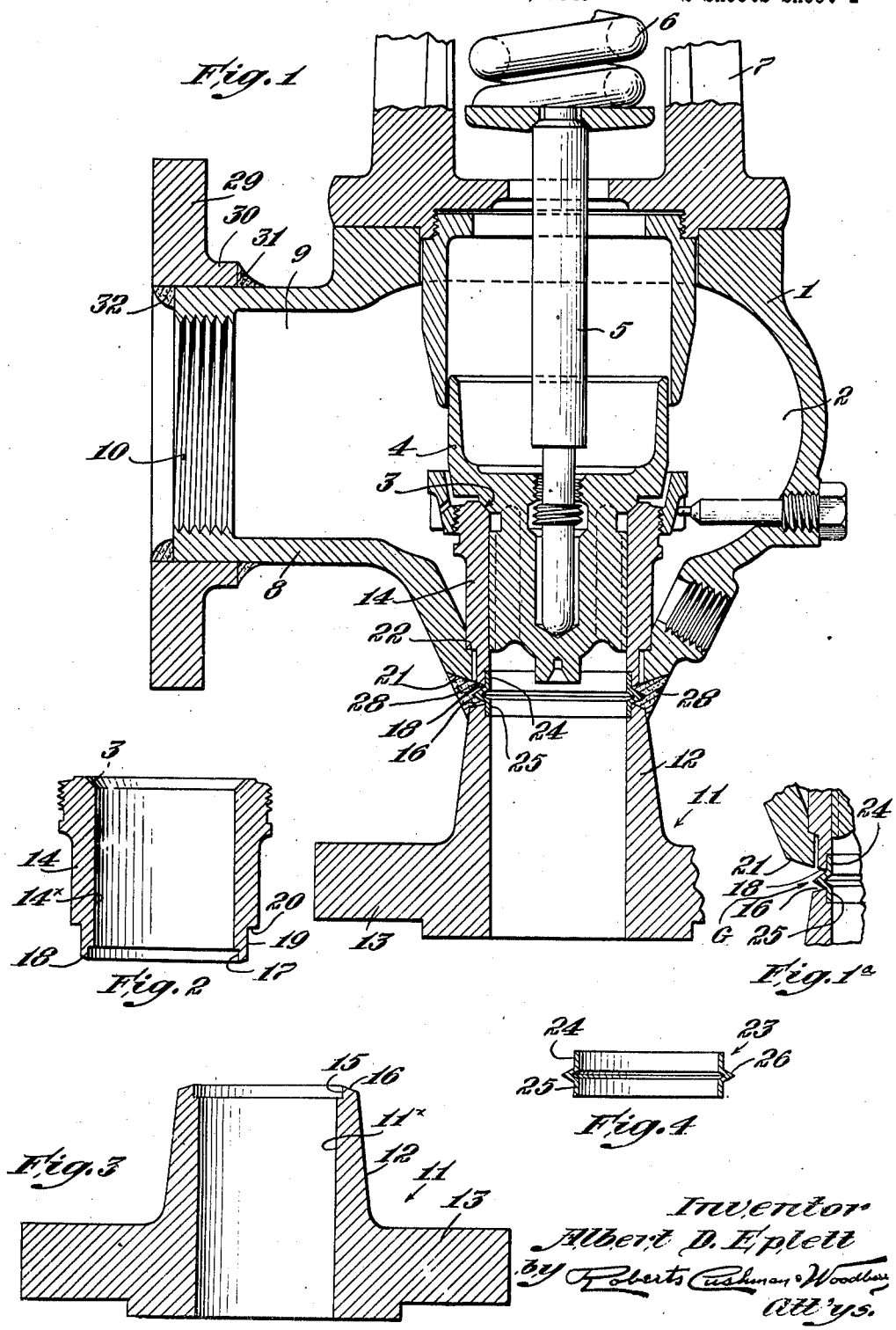
Inventor
Albert D. Eplett
by Roberts Cushman & Woodbury
Att'ys.

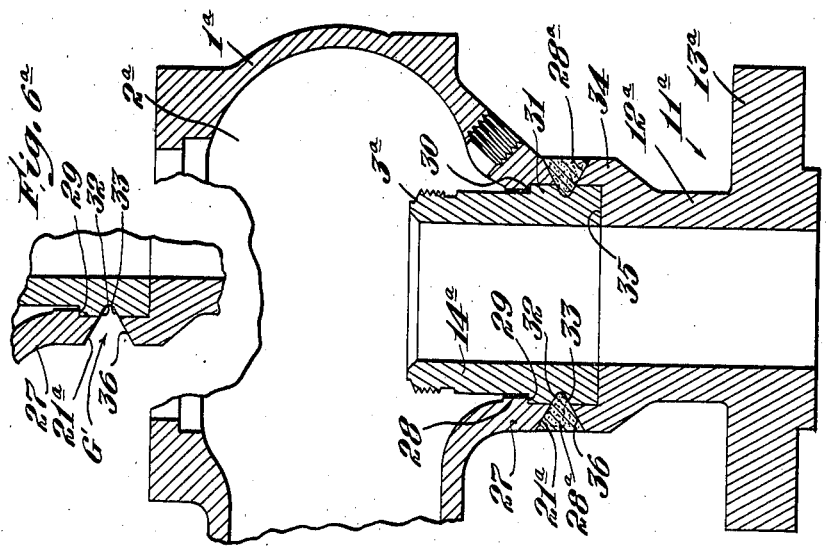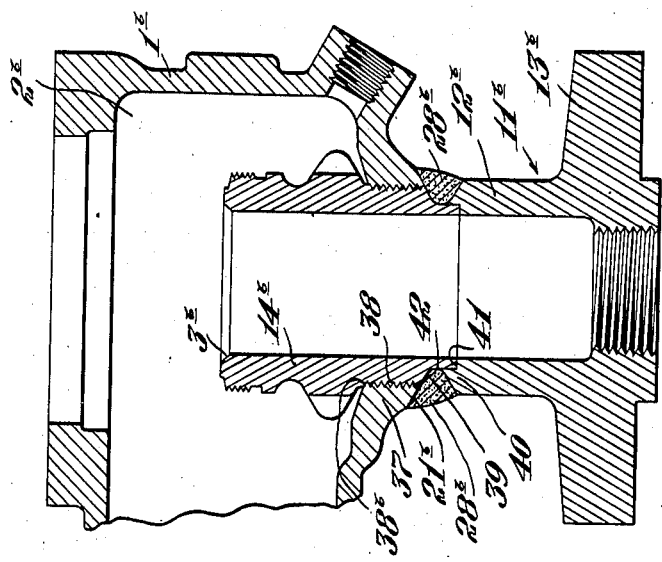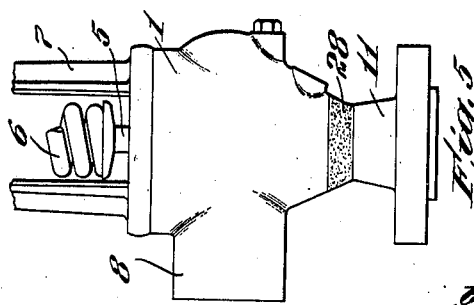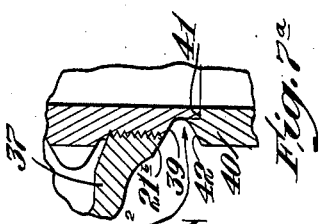

Patented May 2, 1944

2,347,676

UNITED STATES PATENT OFFICE 2,347,676

SAFETY VALVE

Albert D. Eplett, Bridgeport, Conn., assignor to Manning, Maxwell & Moore, Incorporated, New York, N. Y., a corporation of New Jersey Application March 10, 1943, Serial No. 478,629

6 Claims. (Cl. 251—156)

This invention pertains to safety valves such as are commonly employed on steam boilers or other pressure generators in order automatically to relieve excessive pressure, the present application being a continuation-in-part of copending application Serial No. 415,702, filed October 20, 1941.

Customarily such a safety valve includes a casing having a hollow body portion, which houses the valve seat and the movable valve head or feather, and a base which comprises a tubular upstanding neck portion and a radial flange or its equivalent by means of which the valve casing is secured to the boiler l. The casing also commonly includes a hollow laterally extending outlet arm provided at its outer end with means for connecting it to a delivery pipe. The seat is commonly formed at the upper end of a bushing member which is coaxial with the neck portion of the base and which projects up into the hollow body. Usually the several parts of the casing, to wit the body portion, the base, the seat bushing and the outlet arm are made of the same material, for example as an integral casting, forging or the like, although in certain improved types of valve the seat bushing is a separate element screw threaded to the casing body or neck and which may be of a material different from the other parts of the casing. For example the seat bushing may be of material which is resistant to wear and corrosion. Furthermore, the bushing is sometimes designed to minimize distortion effects, as disclosed for instance in the patent to Graesser et al. No. 1,668,453, dated May 1, 1928.

The use of extremely high temperatures and pressures in steam engineering and in the petroleum industries necessitates the use of safety valves capable of withstanding such conditions of use without danger of failure either mechanically or functionally. This suggests the desirability of employing exceptionally strong materials, for instance special alloys, at those parts of the casing, where the greatest stresses occur, for example in the base with its attaching flange. However, such special alloys are usually expensive, and since their peculiar characteristics may not be necessary in the casing body, it is desirable to use materials of several different kinds in forming the casing structure.

Principal objects of the present invention are to provide a safety valve casing useful under conditions of extremely high pressure and temperature and which may be made readily and at a minimum cost and in which are employed materials peculiarly appropriate for the different respective constituent parts but so integrally joined, as by welding, as to prevent leakage at the junction points; to provide such a safety valve casing capable of use under high temperature conditions without danger of substantial distortion or displacement of the valve seat, and to provide a novel method of making such a valve casing.

Other and further objects and advantages of the invention will be pointed out hereinafter in further detail and by reference to the accompanying drawings wherein Fig. 1 is a fragmentary vertical section of a valve casing constructed in accordance with the present invention, the bonnet being broken away, and the valve head or feather being shown seated;

Fig. 1a is a fragmentary detail showing the groove which receives the welding metal;

Fig. 2 is a diametrical section of the seat bushing;

Fig. 3 is a diametrical section of the base member of the casing;

Fig. 4 is a diametrical section of an aligning ring preferably forming a part of the completed valve;

Fig. 5 is a fragmentary side elevation to smaller scale, showing a slightly modified construction as compared with that of Fig. 1;

Fig. 6 is a fragmentary section, generally similar to Fig. 1, but illustrating a modified and preferred construction;

Fig. 6a is a fragmentary detail illustrating the groove which receives the welding metal;

Fig. 7 is a view similar to Fig. 6 but showing a further modification; and

Fig. 7a is a fragmentary detail showing the groove which receives the welding metal.

Referring to the drawings (Fig. 1) the numeral I designates the body portion of the casing. This portion may be made of any suitable material appropriate for the purpose, for example carbon steel, bronze, or a low alloy steel and may be a casting or forging. This portion of the casing is not subjected to such trying conditions during use as are the base and seat bushing, and thus the body may be of a cheaper material than the other parts if desired. The body I is hollow, providing the interior chamber 2 within which is located the valve seat 3 and the movable valve head or feather 4. As illustrated, the valve head is provided with the stem 5 which is engaged by the loading spring 6, housed within the bonnet 7, and as here shown.

the body is provided with a lateral hollow arm or extension providing the delivery passage 9. As shown in Fig. 1 this tubular extension 8 is provided at its outer end with internal screw threads 10 for the reception of the threaded end of a delivery pipe or nipple.

The base portion 11 (Figs. 1 and 3) of the casing comprises the upwardly directed tubular neck 12 which preferably tapers upwardly in diameter from its junction with the heavy radial attaching flange 13. This flange 13 may be provided with the usual bolt holes (not shown) for the reception of bolts or rivets by means of which the flange and casing are secured to the shell of the boiler or other part upon which the valve is to be mounted.

The seat bushing 14 (Figs. 1 and 2) is arranged within the lower part of the chamber 2 of the body portion, preferably so that the major part, at least, of the bushing is housed within the chamber 2. The bushing and neck of the base are of the same internal diameter and are axially aligned in the completed valve.

Referring to Fig. 3, the upper part of the neck 12 of the base portion is provided with an internal annular recess 15 and the upper end surface of the neck is inwardly and upwardly sloped or bevelled at 16.

Referring to Fig. 2, the seat bushing 14 is provided with the seat surface 3 at its upper end and at its lower portion with an internal annular recess 17 and its lower end surface is inwardly and downwardly sloped or bevelled at 18. The lower part of the bushing is also provided with an external peripheral recess 19 providing an annular, preferably horizontal shoulder 20.

The lower end of the body portion 1 (Fig. 1) is inwardly and downwardly sloped or bevelled at 21 and said lower part of the body portion is provided with an internal recess defining the annular shoulder 22 which is preferably horizontal and which is spaced above the sloping or bevelled lower end surface 21 of the body portion.

In accordance with this invention there is preferably provided an aligning ring 23 (Fig. 4) consisting of a short length of metal tubing whose upper and lower portions 24 and 25 are designed respectively to seat in the recess 17 of the seat bushing and in the recess 15 of the neck. The thickness of the material of this ring 23 is such that when its upper and lower portions 24 and 25 are seated in the recesses 17 and 15 respectively, the inner surfaces of these portions 24 and 25 are flush with the inner cylindrical surfaces 14$^x$ and 11$^x$ respectively of the bushing and base. Preferably this tubular ring 23 is crimped at its mid-portion to provide an outwardly directed rib or fin 26.

Having prepared the parts as above described, the bushing 14 is introduced into the body 1 and so disposed that the peripheral shoulder 20 of the bushing rests upon the shoulder 22 of the body portion, with the lower part of the bushing, below the shoulder 20 extending down within and coaxial with the lower part of the body portion and with the inwardly and downwardly sloping or bevelled surface 18 of the bushing forming a substantial continuation of the inwardly and downwardly sloping or bevelled surface 21 of the body portion. The upper portion 24 of the aligning ring 23 is fitted into the lower part of the seat bushing and the neck portion of the base is fitted onto the lower portion 25 of the ring 23—the ring serving to hold the bushing and neck in accurate alignment during the welding operation. As is evident from consideration of Fig. 1, the surfaces 21, 18 and 16 are all annular and coaxial and of such diameter respectively that the surface 16 is in axial registry with but spaced from the surface 18 and preferably in registry with the inner portion at least of the surface 21. With the parts thus disposed, the sloping surfaces 21 and 18 form portions of the upper wall and the sloping surface 16 forms a portion of the wall of a peripheral groove or channel G (Fig. 1$^a$) designed to receive an annular body of welding material.

Welding metal 28 (Fig. 1) is now introduced into the annular channel thus defined by the sloping or bevelled surfaces 16, 18 and 21—such welding metal forming a continuous annulus which permanently unites the ring 23, the bushing 14, the body 1 and the neck 12 of the base—the ring of welding metal providing a permanent, leak-tight union between the parts.

After the completion of this welding operation the casing is subjected to an annealing operation thereby to remove the strains introduced during welding. After this annealing operation, the valve seat surface 3 is dressed, and since the annealing operation is carried out at a temperature higher than any temperature to which the valve is subjected during use, all substantial danger of distortion of the seat due to the elevated temperatures of use is thus substantially eliminated.

While the valve casing as thus far described and as particularly illustrated in Fig. 5 is designed for use with a delivery pipe which is screw threaded to the internally threaded lateral extension 8 of the casing, it is readily possible to convert this valve casing for use with a flanged pipe connection. Thus as illustrated in Fig. 1, a radial attaching flange 29 having a short tubular boss 30 may be slipped over the end of the tubular extension 8 and may then be welded to the latter, preferably by annular bodies of welding metal at the points 31 and 32. The flange 29 may now be coupled in the usual way to a corresponding flange (not shown) on the end of a delivery pipe.

Since the body, the seat bushing and the base are separately constructed, it is readily possible to make them of wholly different materials. Thus, as above suggested, the body portion may be of a relatively cheap material such as carbon steel or a relatively cheap alloy while the base 11 may be of a forged alloy steel of great strength and toughness, but by reason of its relatively small size as compared with the entire casing, such more expensive metal may be used for this part without unduly increasing the total cost. Likewise the seat bushing 14 may be made of a relatively expensive alloy for example stainless steel or bronze which is resistant to wear, high temperatures and corrosion and since this seat bushing is quite short as compared with the seat bushings such as have commonly been used heretofore in safety valves, the cost of construction is thereby further minimized.

While the ring 23 is desirable as a means for aligning the parts during the welding operation and also to avoid any difficulty from the flow of welding metal into the inlet passage through the base and seat bushing, it is contemplated that this ring may be dispensed with if other and equivalent means be substituted.

Fig. 6 illustrates a preferred embodiment. The body of the casing is indicated at 1$^a$. This body defines a chamber 2$^a$ within which is located the valve seat 3$^a$ formed upon the upper end of the bushing 14ª. The downwardly directed annular lower portion 27 of the casing body terminates in an inwardly and downwardly sloping or bevelled peripheral surface 21ª. Inside of the lower portion 27 of the body and spaced above the inner edge of the sloping surface 21ª is an annular boss 28 whose inner cylindrical wall is of a diameter such as to permit the upper portion of the bushing 14ª to telescope freely within it. The boss 28 has a bottom shoulder 29 which constitutes a stop or abutment for engagement by a complemental shoulder 30 formed at the junction of the upper part of the bushing 14ª with a lower portion 31 which is of somewhat greater external diameter. This lower portion of the bushing has an external recess of more or less V-shape in transverse section, having the downwardly and inwardly sloping upper wall 32 and the outwardly and downwardly sloping lower wall 33. When the bushing and body are assembled, the upper wall 32 of this groove substantially aligns with the sloping surface 21ª of the body.

The base 11ª is generally similar to the base 11 above described. It comprises a neck portion 12ª and an attaching flange 13ª. The neck 12ª has a substantially cylindrical lower portion which integrally merges with an upper portion 34 of greater external diameter. This upper portion is internally recessed to provide a horizontal seat 35 on which the lower end of the bushing 14ª rests, when the parts are assembled. The external diameter of the lower portion of the bushing is such that it may telescope freely into this recess in the part 34 of the base. The upper end 36 of the base 11ª slopes inwardly and upwardly, and, when the parts are assembled, is substantially aligned with the lower wall 33 of the recess in the bushing. The surfaces 21ª, 32, 33 and 36 thus constitute portions of the walls of a peripheral groove $G^1$ which, after assembly of the parts, is filled with an annular body 28ª of welding metal which permanently unites the body, bushing and base to form a leak-tight joint between them.

In this arrangement no liner ring is employed (such as that forming a permanent part of the structure of Fig. 1) but in assembling the parts, a clamping fixture may be passed through the aligned bores of the bushing and base (after first inserting the bushing upwardly into the body) and after the parts of this fixture have been drawn together so as to bear, for example, against the seat 3ª and the lower surface of the base 11ª, the welding operation may be performed with assurance that the parts of the casing will be accurately aligned axially in the completed structure.

In the arrangement of Fig. 7, the body portion 1ᵇ of the casing has within it the chamber 2ᵇ within which is located the valve seat 3ᵇ formed at the upper end of the bushing 14ᵇ. The lower annular portion 37 of the body is internally screw threaded for engagement with screw threads on the peripheral surface of the lower portion of the bushing 14ᵇ, the screw threads on the latter terminating at 38ᵇ so that an internal shoulder is formed at the latter point. As shown in Fig. 7, this bushing 14ᵇ is provided with one or more peripheral grooves and one or more external ribs above its screw threaded portion, such grooves and ribs functioning as described in the patent to Graesser et al. No. 1,668,453 to prevent the transmission to the valve seat of distortions of the casing.

The lower edge 21ᵇ of the part 37 of the body is rearwardly and downwardly sloped or bevelled, and the bushing has a downwardly and inwardly sloping peripheral surface 39 which, in the assembled structure, forms a substantial continuation of the surface 21ᵇ. The bushing is extended downwardly below the lower edge of the sloping surface 39 to form a cylindrical sleeve portion which telescopes freely within a recess in the upper end portion 40 of the neck 12ᵇ of the base member 11ᵇ, the latter comprising the heavy attaching flange 13ᵇ. The floor 41 of the recess in the portion 40 of the neck forms a support for the lower edge of the bushing 14ᵇ. The top of the neck 12ᵇ of the base has an outwardly and downwardly bevelled or sloping peripheral surface 42 which constitutes a portion at least of the lower wall of an annular groove $G^2$ whose upper wall comprises the surfaces 21ᵇ and 39.

After assembling the parts of the casing by the use of a suitable clamping fixture which keeps them in proper axial alignment (the bushing 14ᵇ having first been screwed down into the part 37 of the base) the groove $G^2$ is filled with welding metal 28ᵇ which permanently unites the parts of the casing to form a leak-tight joint. The screw threads which unite the bushing and the body portion of the casing assist in the initial assembling of the parts and form a dependable mechanical connection between them independent of the weld although the threaded connection need not be leak-tight.

While certain desirable arrangements have been specifically described, it is to be understood that all equivalent arrangements and modes of procedure are to be regarded as falling within the scope of the appended claims.

I claim:

1. A safety valve having a casing comprising a hollow body portion terminating at its lower end in a downwardly and inwardly bevelled annular surface and having an interior annular shoulder spaced above said surface, a seat bushing seated upon the interior annular shoulder of the body and having its lower end bevelled to form a substantial continuation of the lower surface of the body, a base including a tubular neck portion whose upper end is inwardly and upwardly bevelled, thereby, in cooperation with the bevelled surfaces of the body and seat bushing, to provide portions of the walls of an external circumferential groove, and a single annular body of welding metal filling said groove and permanently uniting the body, seat bushing and base.

2. A safety valve having a casing comprising a hollow body portion terminating at its lower end in a downwardly and inwardly sloping annular surface, a seat bushing coaxial and having screw threaded engagement with the lower part of the body portion, said bushing having a downwardly and inwardly sloping annular surface forming a substantial continuation of the sloping annular surface of the body portion, a base including a tubular neck portion having at its upper part an internal annular recess providing a seat for the lower end of the bushing and having an inwardly and upwardly sloping annular peripheral surface at its upper end, said latter annular surface being spaced below and in substantial registry with one at least of the first-named annular surfaces, the several sloping surfaces forming portions respectively of the walls of an external circumferential groove, and a single annular body of welding metal filling the groove and permanently uniting the body, seat bushing and base.

3. A safety valve having a casing comprising a hollow body portion terminating at its lower end in a downwardly and inwardly sloping annular surface, a seat bushing coaxial with the lower part of the body portion, said bushing having a downwardly and inwardly sloping annular surface forming a substantial continuation of the sloping annular surface of the body portion, a base including a tubular neck portion having an inwardly and upwardly sloping annular surface at its upper end, said latter annular surface being spaced below and in substantial registry with one at least of the first-named annular surfaces, the several sloping surfaces forming portions respectively of the walls of an external circumferential groove, and a single annular body of welding metal filling the groove and permanently uniting the body, seat bushing and base.

4. A safety valve having a casing comprising a hollow body portion terminating at its lower end in a downwardly and inwardly bevelled annular surface and having an interior annular shoulder spaced above the lower edge of said bevelled surface, the bushing having in its lower portion an external peripheral recess having an upwardly and outwardly sloping upper wall forming a substantial continuation of said lower bevelled surface of the body, the recess also having a downwardly and outwardly inclined lower wall, a base including a tubular neck portion whose upper end is inwardly and upwardly bevelled and which forms a substantial continuation of the lower wall of said annular recess, the inclined surfaces of the body and base together with the inclined top and bottom walls of the recess defining an external circumferential groove, and a single annular body of welding metal filling said groove and permanently uniting the body, seat bushing and base.

5. A safety valve having a casing comprising a hollow body portion provided with an internal annular shoulder spaced upwardly from its lower end, a seat bushing which seats upon said shoulder, said seat bushing comprising a part which projects below said shoulder and which is provided with an internal peripheral recess at its lower end, a base including a tubular neck coaxial with the seat bushing and having an internal peripheral recess at its upper end, an aligning ring having its opposite end portions, fitting within the recess in the bushing and neck respectively, and an annular body of welding material embracing the mid portion of said ring and permanently uniting the body and bushing to the neck.

6. A safety valve having a casing comprising a hollow body portion, a tubular seat bushing whose major part at least is housed within the hollow body, a base including a tubular elongate neck portion, the neck portion and bushing being coaxial and of substantially the same internal diameter, a short, tubular aligning ring having its opposite end portions fitting within the lower end of the bushing and the upper end of the neck respectively, said ring having an outwardly directed bead at its mid portion, and a body of welding metal permanently uniting the ring, neck, body and bushing.

ALBERT D. EPLETT.